US012755133B2

(12) United States Patent
Yang et al.

(10) Patent No.: US 12,755,133 B2
(45) Date of Patent: Oct. 6, 2026

(54) SYSTEMS AND METHODS FOR CONVERTING AN ELECTRONIC DATA CAPTURE DATASET TO A STANDARD DATA TABULATION MODEL (SDTM) DATASET

(71) Applicant: MEDIDATA SOLUTIONS, INC., New York, NY (US)

(72) Inventors: Eric Yang, Warminster, PA (US); Laura Katz, Brooklyn, NY (US)

(73) Assignee: Medidata Solutions, Inc., New York, NY (US)

( * ) Notice: Subject to any disclaimer, the term of this patent is extended or adjusted under 35 U.S.C. 154(b) by 626 days.

(21) Appl. No.: 18/351,384

(22) Filed: Jul. 12, 2023

(65) Prior Publication Data

US 2025/0021794 A1 Jan. 16, 2025

(51) Int. Cl.
*G06F 16/25* (2019.01)
*G06N 3/045* (2023.01)

(52) U.S. Cl.
CPC ........... *G06N 3/045* (2023.01); *G06F 16/258* (2019.01)

(58) Field of Classification Search
CPC .......... G06N 3/045; G06N 3/00; G06N 3/044; G06N 3/08; G06F 16/258; G06F 16/88; G06F 3/0442; G06F 18/22; G06F 18/241; G16H 10/20; G16H 10/60; G16H 50/70
See application file for complete search history.

(56) References Cited

U.S. PATENT DOCUMENTS

| | | | | |
|---|---|---|---|---|
| 10,095,716 | B1 * | 10/2018 | Juneja | G06F 40/242 |
| 11,645,456 | B2 * | 5/2023 | Velagapudi | G06F 40/20 704/9 |
| 11,861,454 | B2 * | 1/2024 | Park | A61B 5/7264 |
| 12,001,790 | B2 * | 6/2024 | Lahlou | G06N 3/08 |
| 12,112,837 | B2 * | 10/2024 | Ramanujam | G06F 40/20 |
| 12,552,035 | B2 * | 2/2026 | Cella | G06Q 10/20 |
| 2009/0076846 | A1 * | 3/2009 | Bentwich | G16H 10/60 705/2 |

(Continued)

FOREIGN PATENT DOCUMENTS

| | | |
|---|---|---|
| JP | 2023-529097 A | 7/2023 |
| WO | 2015/118878 A1 | 8/2015 |

OTHER PUBLICATIONS

Kaya et al., "Deep Metric Learning: a Survey", Aug. 21, 2019, Symmetry 2019, pp. 1-26 (Year: 2019).*

(Continued)

*Primary Examiner* — Jorge A Casanova
(74) *Attorney, Agent, or Firm* — Fish & Richardson P.C.

(57) ABSTRACT

Converting an Electronic Data Capture (EDC) dataset to a Standard Data Tabulation Model (SDTM) dataset is described, including processing metadata for an EDC dataset, the metadata comprising EDC field names, to produce vectors of a particular dimensionality. The vectors are processed in an embedding model to produce embedded vectors of a lesser dimensionality. The embedded vectors are processed, in a prediction model, to produce class predictions for the EDC field names, the classes corresponding to the SDTM field names. The EDC field names are mapped with the SDTM field names based on the class predictions for the EDC field names. The embedding model is obtained from a trained Siamese neural network.

18 Claims, 5 Drawing Sheets

(56) References Cited

U.S. PATENT DOCUMENTS

| | | | | |
|---|---|---|---|---|
| 2017/0220773 | A1* | 8/2017 | Janevski | G16H 10/20 |
| 2018/0101584 | A1* | 4/2018 | Pattnaik | G06F 16/86 |
| 2020/0105421 | A1* | 4/2020 | Glushakov | G06F 16/9038 |
| 2020/0185063 | A1* | 6/2020 | Narain | G01N 33/48 |
| 2022/0084686 | A1* | 3/2022 | Bronkalla | G06F 16/285 |
| 2023/0005573 | A1 | 1/2023 | Ramanujam | |
| 2023/0123322 | A1* | 4/2023 | Cella | G05B 23/0283 700/29 |
| 2024/0047080 | A1* | 2/2024 | Malfait | G16H 70/20 |
| 2024/0211754 | A1* | 6/2024 | Park | G06N 3/045 |

OTHER PUBLICATIONS

Anonymous "Siamese neural network—Wikipedia", Aug. 9, 2022, 5 pages, https://web.archive.org/web/20220809051913/https://en.wikipedia.org/wiki/Siamese_neural_network.

Austin et al. "If you want to deliver standardised clinical data sets quickly, talk to the machine", Nov. 16, 2022, 6 pages, https://www.lexjansen.com/phuse/2022/ml/PAP_ML03.pdf.

Tomioka "SDTM Mapping based on Natural Language Process and Machine Learning", Oct. 1, 2018, 10 pages, https://www.researchgate.net/publication/349103062_SDTM_Mapping_based_on_Natural_Language_Process_and_Machine_Learning.

Extended European Search Report from European Patent Application No. 24187755.4, Nov. 29, 2024, 10 pages.

Office Action from Japanese Patent Application No. 2024-104875, 3 pages, Sep. 24, 2025.

Brand et al. "A Model Data Management Plan Standard Operating Procedure: Results From the DIA Clinical Data Management Community, Committee on Clinical Data Management Plan." Ther. Innov. Regul. Sci. vol. 49, No. 5, 2015, pp. 720-729. https://doi.org/10.1177/2168479015579520.

Du et al. "How Many Samples are Needed to Estimate a Convolutional or Recurrent Neural Network?" Jun. 30, 2019, pp. 1-28. https://doi.org/10.48550/ARXIV.1805.07883.

Gaddale "Clinical Data Acquisition Standards Harmonization Importance and Benefits in Clinical Data Management." Perspect. Clin. Res. vol. 6, No. 4, Oct.-Dec. 2015, pp. 179-183. https://doi.org/10.4103/2229-3485.167101; retrieved from https://www.ncbi.nlm.nih.gov/pmc/articles/PMC4640009/.

Hofer et al. "Few-shot Learning for Named Entity Recognition in Medical Text." arXiv Nov. 13, 2018, pp. 1-10. http://arxiv.org/abs/1811.05468.

Kaufman et al. "Data Standardization, Pharmaceutical Drug Development, and the 3Rs." ILAR J. vol. 57, No. 2, 2016, pp. 109-119. https://doi.org/10.1093/ilar/ilw030.

Lin et al. "A standard-driven approach for electronic submission to pharmaceutical regulatory authorities" J. Biomed. Inform. 79, 2018, pp. 60-70. https://doi.org/10.1016/j.jbi.2018.01.006.

Liu et al. "RoBERTa: a Robustly Optimized BERT Pretraining Approach." Jul. 26, 2019, 13 pages. https://doi.org/10.48550/ARXIV.1907.11692.

Lu et al. "Clinical data management: Current status, challenges, and future directions from industry perspectives" Open Access J. Clin. Trials, Jun. 19, 2010, pp. 93-105. https://doi.org/10.2147/OAJCT.S8172.

Myshko "Wearables in Clinical Trials." PharmaVoice, Mar. 1, 2019, 12 pages. https://www.pharmavoice.com/article/2019-03-wearables/.

Sheetz et al. "Evaluating Source Data Verification as a Quality Control Measure in Clinical Trials" Therapeutic Innovation & Regulatory Science, No. 48, vol. 6, 2014, pp. 671-680.

Stokman et al. "Risk-based Quality Management in CDM. An inquiry into the value of generalized query-based data cleaning" Journal of the Society for Clinical Data Management, vol. 1, No. 1, 2021, pp. 1-8.

Yang et al. "Effectiveness Results for Popular e-Discovery Algorithms." ICAIL 2017, Jun. 2017, 4 pages. http://ir.cs.georgetown.edu/downloads/yang-icail-2017.pdf.

Medidata | Rave | Whitepaper "Modernizing Clinical Data Management to Be Scalable, Flexible, and Intelligent" 2021, 13 pages. https://www.medidata.com/wp-content/uploads/2021/09/Modernizing-Clinical-Data-Management-White-Paper-Jun-21.pdf.

"Accelerating innovation." Novartis in Society Integrated Report 2021, 3 pages. https://www.reporting.novartis.com/2021/novartis-in-society/our-performance/go-big-on-data-and-digital/accelerating-innovation.html.

"The Evolution of Clinical Data Management to Clinical Data Science (Part 3: the evolution of the CDM role)—a Reflection Paper on the evolution of CDM skillsets and competencies." Society for Clinical Data Management, Aug. 31, 2020, pp. 1-31.

* cited by examiner

| | Overall Accuracy | Macro F1 |
|---|---|---|
| Correct class found in top 5 nearest neighbors | 0.904 | 0.899 |
| Correct class predicted by nearest neighbor | 0.834 | 0.831 |
| Correct class is most common of 5 nearest neighbors | 0.849 | 0.846 |
| Xgboost with TF-IDF | 0.761 | 0.604 |
| RoBERTa Class Prediction | 0.810 | 0.643 |

SYSTEMS AND METHODS FOR CONVERTING AN ELECTRONIC DATA CAPTURE DATASET TO A STANDARD DATA TABULATION MODEL (SDTM) DATASET

BACKGROUND

Technical Field

The present disclosure generally relates to mapping Electronic Data Capture (EDC) fields for clinical trial data to the Study Data Tabulation Model (SDTM) and converting EDC datasets to SDTM datasets.

Description of the Related Art

Clinical trials have mushroomed with highly sophisticated protocols and multiple divergent data sources, large data volumes, decentralization, and increasingly complex adaptive designs. One estimate indicates that data points collected in Phase III trials have increased threefold in the last 10 years, to an average of 3.6 million, and increased trial complexity is driving the expanding volume arising from an increasingly wider array of sources.

Electronic Data Capture (EDC) systems are extensively used in clinical trials to collect and manage data. They include software applications that allow data entry directly at the point of collection, replacing traditional paper-based data collection methods. Before a trial begins, the clinical trial protocol is used to design the electronic Case Report Form (eCRF) within the EDC system. The eCRF contains a structured format for entering the trial data. The design includes all necessary fields for capturing data specified in the trial protocol, such as patient demographics, medical history, treatment assignments, lab results, adverse events, and outcomes.

An important advance in clinical data management has been the standardization of trial data by mapping it into the Standard Data Tabulation Model (SDTM), which defines a standard structure for human clinical trial data tabulations and non-clinical study data tabulations that are to be submitted as part of a product application to a regulatory authority, such as the U.S. Food and Drug Administration (FDA). This has led to efficiencies in the handling and comparison of clinical data between different trials.

Mapping EDC fields to SDTM can be a challenging technical problem for several reasons. EDC systems are primarily designed for data collection, with fields organized around the needs of clinical data entry and site management. EDC fields, such as those that reference the capture of adverse events, demographics, and other clinical endpoints, may be specified in ways that are study or company-specific and therefore do not readily map to the SDTM standard. SDTM, on the other hand, is designed for data submission to regulatory authorities like the FDA, and follows a standardized structure and terminology set by the Clinical Data Interchange Standards Consortium (CDISC). The differences in structure and terminology can make direct mapping between EDC and SDTM difficult. Furthermore, there is a great deal of variability in the way different EDC systems are designed and used. The same type of data might be captured in different ways in different systems, or even in different studies for the same therapeutic agent. This variability complicates the mapping process.

Therefore, the conventional process of mapping data from electronic data capture (EDC) systems to SDTM generally requires the engagement of programmers who are responsible for reading an annotated case report form (CRF) and writing scripts to convert the data into the SDTM format. Furthermore, the EDC systems used in clinical trials are often designed for ease of trial conduct and the mapping to SDTM is a secondary priority. Therefore, in these conventional approaches, the process of mapping EDC system data into SDTM is very labor-intensive and, in many cases, non-repeatable.

There has been an effort to address these problems by attempting to standardize EDC builds, so that once a mapping for a trial exists, all future trials would essentially follow the same pattern. However, standardization of EDC has certain disadvantages, such as the loss of flexibility, the difficulty in establishing standards in general, and, most importantly, the inapplicability of this approach in mapping legacy trials which have not been submitted previously in SDTM format.

One of the barriers to building a workable machine learning (ML) solution to perform mapping of EDC fields to SDTM is the relative lack of training data, especially when compared to the number of fields that require mapping, of which there may be thousands. Even the largest pharmaceutical companies will have only a few thousand trials from which to leverage for training an algorithm.

SUMMARY

In disclosed embodiments, Siamese networks can be used to generate electronic data capture (EDC) metadata-based embeddings, and a machine learning (ML) classifier can be used on these embeddings to predict the associated Standard Data Tabulation Model (SDTM) field. The Siamese neural network is trained in such a way that similar data points will have a lower dimensional embedding that is closer based on some distance metric, such as the Euclidean distance, than dissimilar data points. This allows a subnetwork to be trained in which the lower dimensional embedding of each field can be compared to all the other fields. In disclosed embodiments, this allows N data points to be expanded to $O(N^2)$ pairs from which to train the classifier neural network. After obtaining this embedding, the lower dimensional representation may be used to generate a final predictive model to classify the EDC form fields to their SDTM domains.

In disclosed embodiments, it is possible to map legacy trials to SDTM format at scale, thereby greatly increasing the value of the legacy data by allowing for cross trial analysis without requiring the overhead of manually harmonizing the datasets prior to analysis.

In disclosed embodiments, Siamese neural networks are used to calculate the similarity between form fields normally specified in EDC systems. These similarity metrics may be fed into a further machine learning stage for the final classification. The output for this can be used either to map EDC data to SDTM at scale and/or to drive tools which provide mapping recommendations.

In one aspect, the disclosed embodiments provide methods, systems, and computer-readable media to convert an Electronic Data Capture (EDC) dataset to a Standard Data Tabulation Model (SDTM) dataset. The methods include processing metadata for an EDC dataset, the metadata comprising EDC field names, to produce vectors of dimensionality $n_1$, where $n_1$ is an integer. The methods further include processing the vectors of dimensionality $n_1$, in an embedding model, to produce embedded vectors of dimensionality $n_2$, where $n_2$ is an integer and is less than $n_1$. The methods further include processing the embedded vectors, in a prediction model, to produce class predictions for the EDC field names, the classes corresponding to the SDTM field names. The methods further include mapping the EDC field names, respectively, with the SDTM field names based at least in part on the class predictions for the EDC field names. The embedding model is obtained from a trained Siamese neural network including a first embedding subnetwork and a second embedding subnetwork.

Embodiments may include one or more of the following features, alone or in combination.

The methods may further include training the Siamese neural network based on a subset of the EDC field names which is pre-mapped to a subset of the SDTM field names. The subset of the EDC field names may be manually curated. The methods may further include generating pairs of vectors of dimensionality $n_1$ to be input, respectively, to the first embedding subnetwork and the second embedding subnetwork. The methods may further include processing, by the first embedding subnetwork and the second embedding subnetwork, the vectors of dimensionality $n_1$ in a long short-term memory neural network to produce the embedded vectors.

The methods may further include determining, in an external layer of the Siamese neural network, a distance between each pair of the embedded vectors produced, respectively, by the first embedding subnetwork and the second embedding subnetwork. The methods may further include applying at least one of a batch normalization and an activation function to determined distances of embedded vectors output by the first embedding subnetwork and the second embedding subnetwork, and backpropagating a result, obtained by the applying, to the first embedding subnetwork and the second embedding subnetwork. Various architectures may be used for the Siamese network and its subnetworks, including different neural network layers, activation functions, and distance metrics. The methods may further include training a classification model using a subset of the EDC field names which is pre-mapped to a subset of the SDTM field names, wherein the subset of the EDC field names is processed by the embedding model before being input to the classification model; and using the trained classification model as the prediction model. The methods may further include converting the EDC dataset to an SDTM dataset based at least in part on the mapping.

Figure 1:
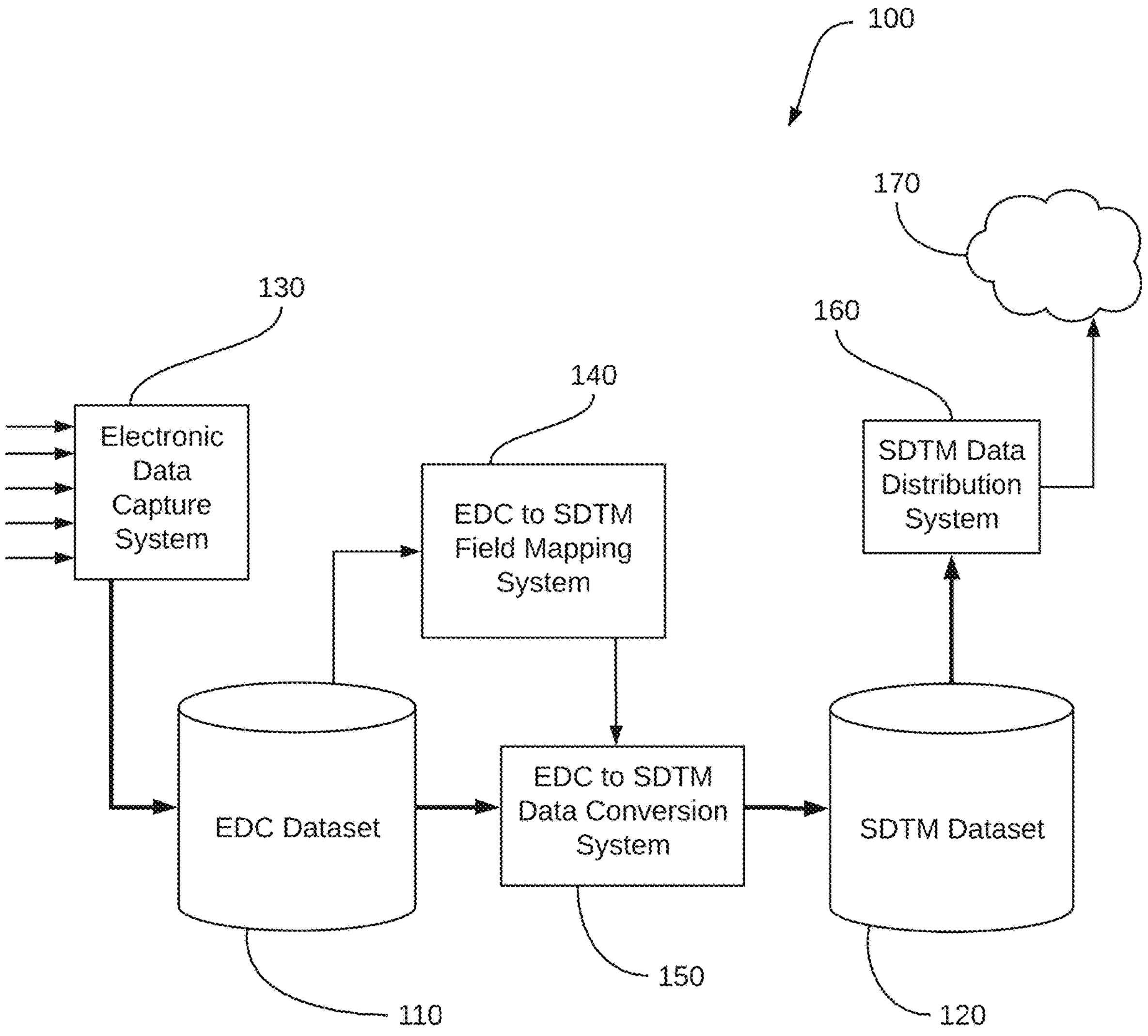
FIG. 1 is a block diagram of a system for converting an Electronic Data Capture (EDC) dataset to a Standard Data Tabulation Model (SDTM) dataset, according to disclosed embodiments.

Where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

In disclosed embodiments, Siamese neural networks are used to compute the similarity between electronic data capture (EDC) fields that map to a Standard Data Tabulation Model (SDTM) entry (referred to herein as "SDTM field"). The resulting similarity metric leads to the generation of a lower-dimensional embedding in which EDC fields that map to the same SDTM field are closer in distance (e.g., Euclidian distance) than those that are farther apart. This lower-level embedding is then fed into a secondary classification algorithm to convert the embedding into an actual prediction.

FIG. 1 is a block diagram of a system 100 for converting an Electronic Data Capture (EDC) dataset 110 to a Standard Data Tabulation Model (SDTM) dataset 120. The EDC dataset 110 is produced by output from an EDC system 130, which may receive EDC data from a number of sources, such as clinical trials sites. To enable the conversion of the data, an EDC to SDTM field mapping system 140 retrieves metadata, including the EDC field names and other metadata, such as the description of the field, the units the field is recorded in as well which Form and Field ID are associated with the field, from the EDC dataset 110 to map the EDC fields to the standardized fields of the SDTM.

The result of the field mapping is output to an EDC to SDTM data conversion system 150, which uses the field mapping to convert the EDC dataset 110 into the standardized form of an SDTM dataset 120. Once the data has been converted, the SDTM dataset 120 may be output to an SDTM data distribution system 160, which controls transmission of the SDTM dataset 120. For example, the SDTM dataset 120 may be received by the SDTM data distribution system 160, which may, in turn, transmit the data, e.g., via a cloud-based network 170, to various SDTM-based systems. In embodiments, the SDTM dataset 120 may be transmitted to a regulator, such as the U.S. Food and Drug Administration (FDA).

Converting EDC datasets for clinical trial data into a dataset having the standardized SDTM format is a technical problem, because it requires the development, implementation, and maintenance of complex methodologies and tools to ensure that the fields of the EDC dataset are accurately mapped to the standardized SDTM fields. While the underlying motivation for performing the mapping of EDC fields and converting the EDC dataset into an SDTM dataset may stem from legal and regulatory requirements, the actual process of achieving the mapping and conversion involves addressing a multitude of technical challenges, as discussed in further detail below.

Figure 2:
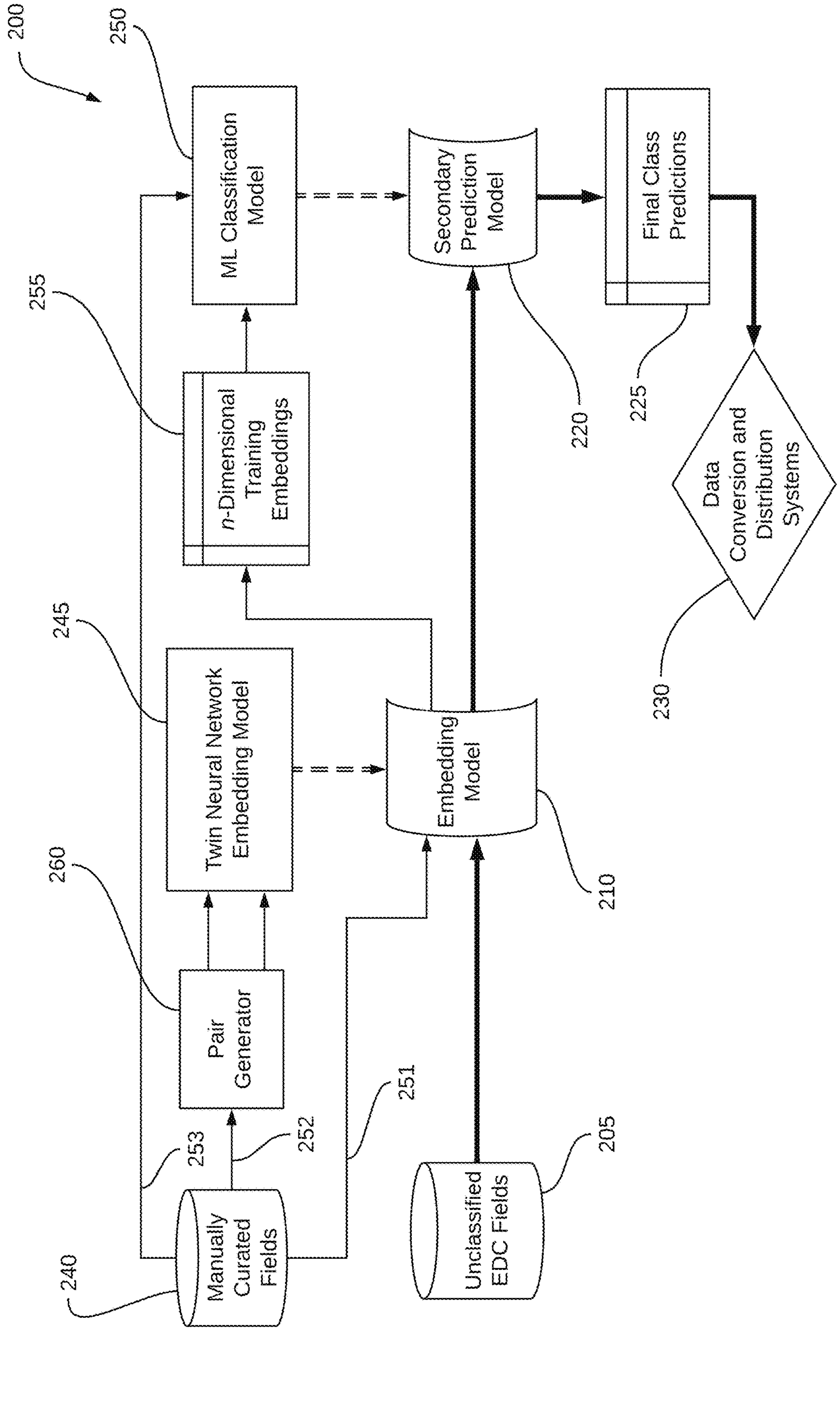
FIG. 2 is a block diagram of an EDC to SDTM field mapping system, according to disclosed embodiments.

FIG. 2 is a block diagram of a neural network-based system 200 for performing EDC to SDTM field mapping. In disclosed embodiments, the system 200 corresponds to the EDC to SDTM field mapping system 140 described above (see FIG. 1). The system 200 trains and uses an architecture of neural networks and machine learning models to process an unclassified EDC field dataset 205 retrieved from an EDC dataset 110 (see FIG. 1). The EDC field dataset 205 is processed by: (i) an embedding model 210; and (ii) a secondary prediction model 220. The result of the processing of the EDC field dataset 205 by these two models is a set of final class (i.e., classification) predictions for the EDC field mappings. Thus, the EDC fields are classified, with specific determined probabilities, in relation to the SDTM fields. The final class predictions 225 may be output to data conversion and distribution systems 230, e.g., the EDC to SDTM data conversion system 150 and SDTM data distribution system 160 discussed above (see FIG. 1). In disclosed embodiments, confidence scores may be determined and the closest matches may be presented via a user interface as suggestions.

In disclosed embodiments, the embedding model 210 and the secondary prediction model 220, which may be referred to as "principal runtime models," are generated by training corresponding "proxy models" and using the resulting trained model as the respective principal runtime model. Specifically, the embedding model 210 is generated by training a Siamese neural network embedding model 245, as described below, and exporting the resulting trained model to be used as the embedding model 210. Similarly, the secondary prediction model 220 is generated by training a machine learning (ML) classification model 250 and using the resulting trained model as the secondary prediction model 220. In disclosed embodiments, the training of the proxy models may be done during runtime, in which case the trained proxy models may be used to periodically update the corresponding principal runtime models. Alternatively, some or all of the training can be done in advance of runtime, with possible periodic updates during runtime.

The training of the proxy models, i.e., the Siamese neural network embedding model 245 and the ML classification model 250, may be performed using a database of pre-mapped, e.g., manually curated, fields 240, which includes EDC fields that have been manually mapped to corresponding SDTM fields. The curated EDC fields are output as training data to the ML classification model 250 via a first path 251 which includes the embedding model 210, which receives the curated EDC fields and outputs a set of n-dimensional training embeddings 255 (e.g., 32-dimensional embeddings). The curated EDC fields and the SDTM fields to which the curated EDC fields are manually mapped, i.e., the final class labels, are output as training data to the Siamese neural network embedding model 245, via a second path 252.

A pair generator 260 is provided along the second path 252 which generates all possible pair combinations between the curated EDC fields and the final class labels to be input to the Siamese neural network embedding model 245. The final class labels are also output to the ML classification model 250 via a third path 253 to be used as ground truth.

As noted above, the system 200 trains and uses an architecture of neural networks and machine learning models to process an unclassified EDC field dataset 205 retrieved from an EDC dataset 110 (see FIG. 1). In disclosed embodiments, the retrieved data may include metadata associated with electronic case report forms (eCRF) used in a clinical trial, such as: the Form Name (FormOID); the pre-text, e.g., a description of the field in question; the post-text, e.g., additional description, such as the format that the input is expected to take, such as expected date format; and the FieldOID, which is the internal identifier for the specific field in question. In disclosed embodiments, these four fields of information may be associated with an SDTM domain. However, while the disclosed embodiments are focused on these four fields, the methodology is not specific to these fields and may be implemented with others, such as the distribution of the recorded data.

In an evaluation performed by the inventors, the dataset was limited to the following domains: Adverse Events (AE), Disposition (DS), Concomitant Medications (CM), Exposure (EC), Medical History (MH), Vital Signs (VS), and Demographic (DM) domains. The fields associated with these domains were manually mapped to SDTM by human curators for purposes of the evaluation. While this did not represent a comprehensive list of domains that are part of an SDTM dataset, these domains were a reasonable representation of the structures that needed to be mapped.

Typically, domains in SDTM format are represented as a mix of unpivoted (i.e., skinny) and pivoted (i.e., wide) formats. To simplify the evaluation, every domain was represented as an unpivoted table. It should be noted that there is a straightforward way of converting a pivoted to an un-pivoted representation based on the SDTM standard. Additionally, the evaluation did not include composite fields (i.e., fields that are result of mathematical operations between one or more fields such as BMI). In the training data used in the evaluation, there were approximately 9000 separate entries that corresponded to 57 different SDTM fields.

Figure 3:
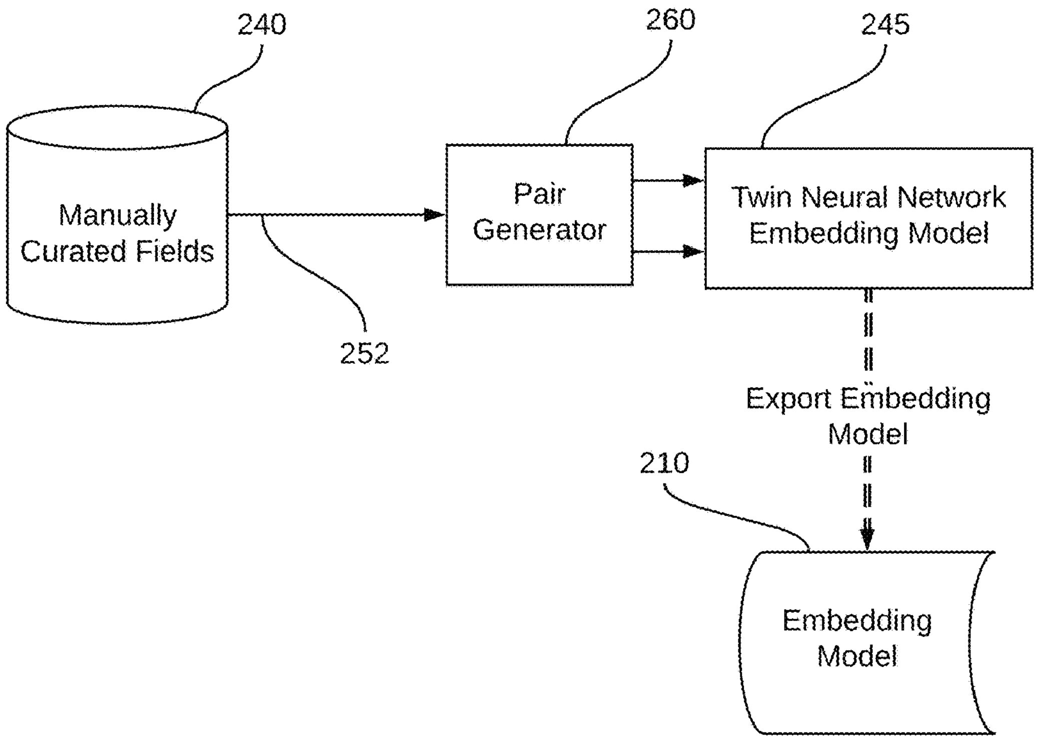
FIG. 3 is a block diagram of a subsystem for generating an embedding model using a Siamese neural network embedding model.

FIG. 3 is a block diagram of a subsystem, e.g., a portion of the system 200 described above, which generates the embedding model 210 using the Siamese neural network embedding model 245. The use of Siamese neural networks (which may be referred to as "Siamese neural networks") provides data embeddings where data within the same class are closer with respect to a given distance metric then they are to data points in another class.

The training of the Siamese neural network 245 uses the database of pre-mapped fields 240, which are EDC fields which have been mapped to corresponding SDTM fields. The database 240 provides EDC metadata to the pair generator 260, including EDC fields which have been manually curated and final class (i.e., classification) labels, which are the corresponding SDTM fields.

In disclosed embodiments, the pair generator 260 may generate all possible pair combinations between the curated EDC fields and may output the resulting pairs to the two independent inputs of the Siamese neural network 245. In disclosed embodiments, the pairs may be randomly generated. As an example, for each SDTM field, 100 pairs are generated where two EDCEDC fields map to the same SDTM entry, e.g., EDC fields labelled as AESTD and AECODED both mapping to AEDECOD, and 100 pairs are generated where the two fields are associated with different SDTM elements, e.g., EDC fields labelled AGE and WEIGHT. The output variable for the Siamese neural network 245 is 0 if they belong in the same SDTM Field and 1 if they are not.

This mapping operation, in effect, expands the amount training data by orders of magnitude. For example, if 1000 data points are paired in every possible combination with another set of 1000 data points, the resulting training set would have one million data points. This is advantageous, because typical language models may require billions of data points. Moreover, as described below in the discussion of the results, the use of a data set which has been effectively expanded in this manner results in a significant improvement in accuracy versus conventional approaches.

The mapping operation sets a minimum distance between two entries from the same class, and if they are not in the same class to set it at some arbitrary distance. A holdout set may be generated which is stratified by SDTM fields, so there will be the same proportion of SDTM fields in the training set and the testing set. For example, 10% of the entries for each SDTM field may be held out from the model training process to be evaluated. This ensures that each class in the dataset is represented in both the training and testing sets.

The Siamese neural network 245 is trained to map text to a lower-dimensional space in such a way that the geometric (e.g., Euclidean) distance between points in that space corresponds to the semantic similarity between the associated text (e.g., EDC metadata). Therefore, similar inputs will have a lower-dimensional embedding that is closer based on some distance metric, such as Euclidean distance, than dissimilar data points. This allows for the training of a subnetwork in which the lower-dimensional embedding of each field can be compared to all the other fields. The lower-dimensional embedding produced by the training of the Siamese neural network 245 is exported to be used as the embedding model 210, which, in turn, is used in the training of the ML classification model 250 (see FIG. 4).

Figure 4:
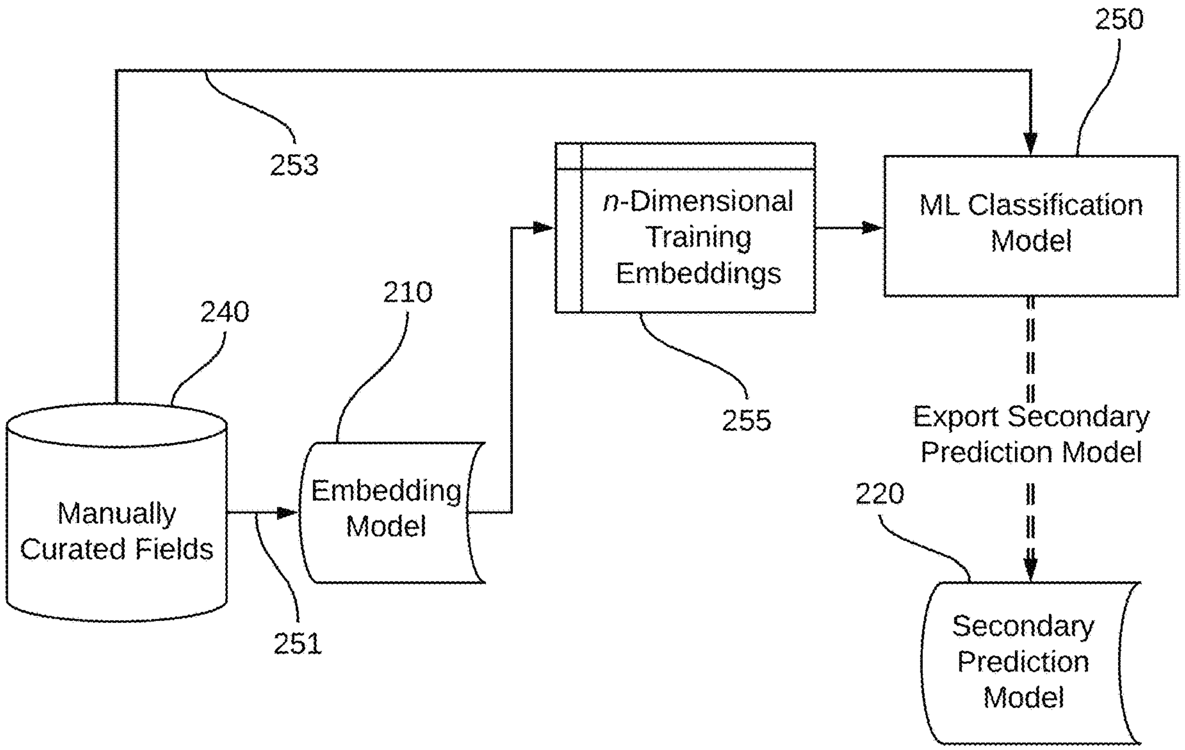
FIG. 4 is a block diagram of subsystem for training an ML classification model using embedding model generated by the Siamese neural network.

FIG. 4 is a block diagram of a subsystem, e.g., a portion of the system 200 described above, which trains an ML classification model 250 using embedding model 210 generated by the Siamese neural network 245. The training uses a database of manually curated fields 240, which are EDC fields which have been manually mapped to corresponding SDTM fields. The database 240 provides EDC metadata, including EDC fields which have been manually curated, to the embedding model 210. The database 240 also provides final class (i.e., classification) labels, which are the corresponding SDTM fields, to the ML classification model 250 to be used as ground truth.

In disclosed embodiments, the ML classification model 250 may be a k nearest neighbors (kNN) classifier. Alternatively, techniques such as XGBoost (an optimized distributed gradient boosting library), Random Forest, or an additional neural network could be used to perform the classifying. The use of a kNN classifier facilitated assessment of the quality of the embedding by providing information regarding the number of nearest neighbors that belong to the same class. Specifically, the following could be assessed: is the correct class found within any of the k nearest neighbors; is the correct class predicted by the nearest neighbors; and is the correct class predicted by a majority vote of the k nearest neighbors?

The embedding model 210, as discussed above, is generated by the Siamese neural network 245 and is adapted to convert text into embeddings, e.g., dense vectors, of a specific dimensionality. In disclosed embodiments, the curated EDC fields from the database 240 are converted into a set of training embeddings in the form of n-dimensional (e.g., 32-dimensional) embeddings 255. The training embeddings 255 are, in turn, used to train the ML classification model 250.

Figure 5:
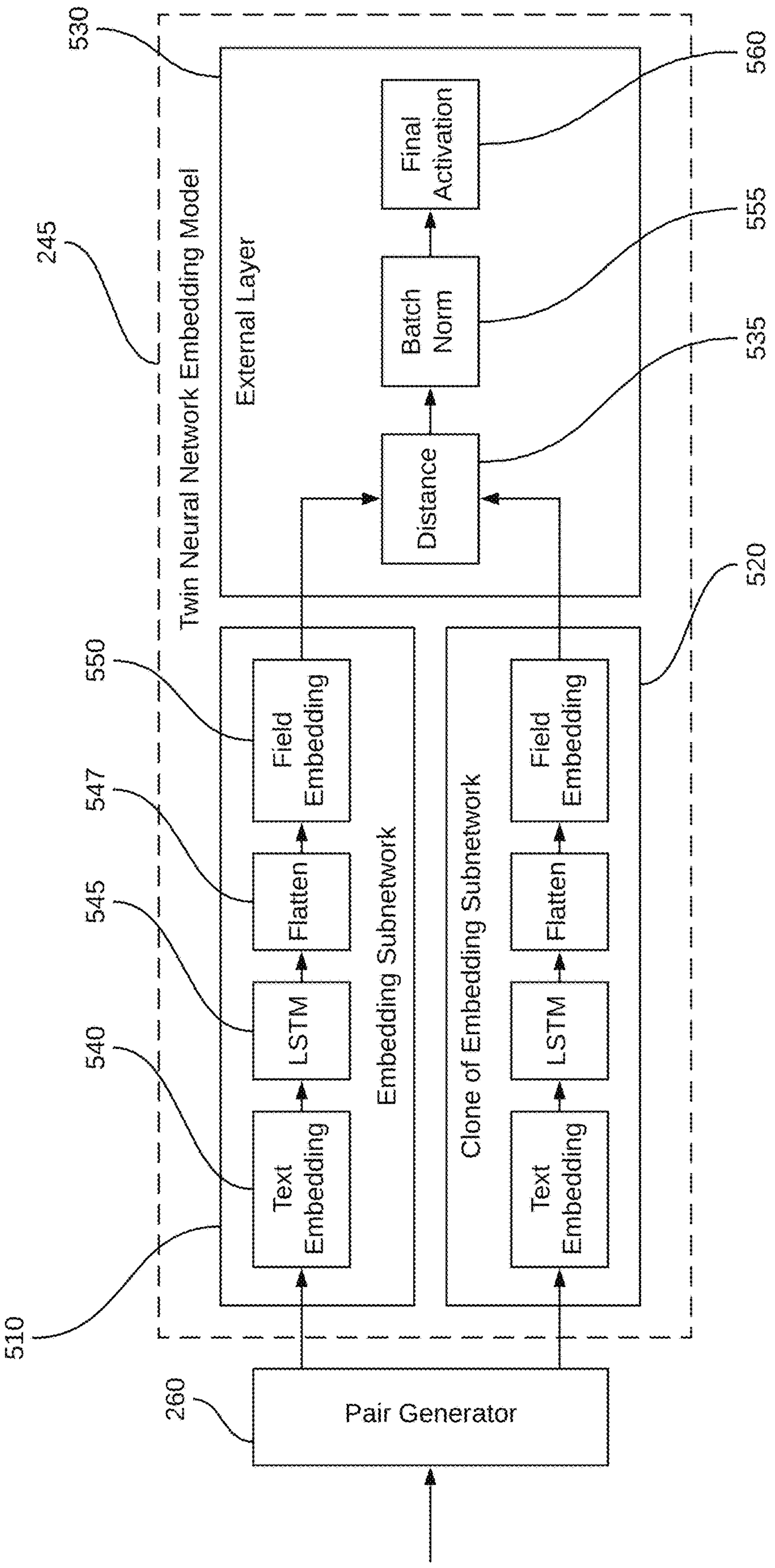
FIG. 5 is a block diagram of the Siamese neural network embedding model and a pair generator.

FIG. 5 is a block diagram of the Siamese neural network embedding model 245 and a pair generator 260. A Siamese neural network architecture is designed to learn the similarity or dissimilarity between two different inputs. In the context of the disclosed embodiments, EDC fields that map to the same SDTM domain should be more similar than EDC fields that map to different SDTM fields.

The Siamese neural network 245 trains a first embedding subnetwork 510, which is a neural network that generates an embedding for a first input from the pair generator 260. A second embedding subnetwork 520, which is a "clone" of the first embedding network 510, i.e., the subnetworks share the same architecture and weights, generates an embedding for a second input from the pair generator 260. The embeddings for the first and second inputs are then compared in an external layer 530 having a distance module 535 which calculates the distance, e.g., the Euclidian distance, between the first and second embeddings.

The embedding subnetworks (510, 520) each include a text embedding layer 540 to convert words into vectors. The text embedding layer 540 converts a linear vector of text that has been dictionary encoded into a matrix with one row per element in the original vector. Words that are found in the same context are then encoded in an N dimensional vector such that similar words will map to similar vectors.

As noted above, the data retrieved from database of manually curated fields 240 may include metadata associated with electronic case report forms (eCRF), such as: the Form Name (FormOID); the pre-text, e.g., a description of the field in question; the post-text, e.g., additional description, such as the format that the input is expected to take, such as expected date format; and the FieldOID, which is the internal identifier for the specific field in question.

In disclosed embodiments, to preprocess the input into a format usable by a neural network, the text is first converted to raw text by stripping out any HTML tags that may be present within the text. This may be done, for example, with the Python html2text library. After conversion, the four fields may be concatenated together. The maximum length of this string is N words. This long string may be dictionary-encoded, e.g., via Gensim. In alternative embodiments, a more sophisticated neural network may be used in which each type of data is encoded separately before being joined by an aggregation layer.

Dictionary encoding may be done by a relatively simple process in which the first word observed in the text is encoded as 1, the second word observed in the series is encoded as 2, etc. This result of the encoding is a numerical vector which can be processed by the neural network. These embeddings are typically high-dimensional (e.g., aa 1000-dimensional vector corresponding to the length of the input), so they will be further condensed by the embedding subnetwork into lower-dimensional embeddings, as described below.

In disclosed embodiments, the text embedding layer 540 is trained along with the embedding subnetwork 510, rather than using a pre-trained word embedding model. This is because the amount of vocabulary that would be specific to EDC to SDTM conversion, such as the FormOIDs and the FieldOIDs, along with the jargon and abbreviations given in the text descriptions, would make it a poor fit for embeddings trained on more general vocabularies.

The encoded text is output by the text embedding layer 540 to a long short-term memory (LSTM) neural network 545, which is a type of recurrent neural network that is particularly good at handling sequences of data. The LSTM 545 can take as input a sequence of word vectors and output a single vector that represents the entire sequence. As explained above, pairs of fields are used to train the Siamese neural network embedding model 245. If a pair of fields is similar, the LSTM 545, and the corresponding LSTM of the clone subnetwork 520, are trained to make their outputs as similar as possible. On the other hand, if the pair of fields is dissimilar, the LSTMs are trained to make their outputs as different as possible. This may be achieved by using a particular type of loss function, such as contrastive loss, as described in further detail below.

The output of the LSTM 545 is processed by a flattening module 547 to constrain the output to a desired distribution. For example, a tanh activation function may be applied to the output of the LSTM 545 to provide the embeddings which are centered around 0 and have a roughly equal distribution of positive and negative values.

The resulting output of the LSTM 545 and flattening module 547 is a set of n-dimensional field embeddings 550, where n is an integer, e.g., 8, 16, 32, 64, etc. As explained above, the field embeddings 550 for the first and second embedding subnetworks (510, 520) are compared in the external layer 530 by a distance module 535 which calculates the distance, e.g., the Euclidian distance, between the embeddings of the first and second embedding subnetworks (510, 520). A batch normalization module 555 may process the output of the distance module 535 to achieve a normalized set of values and, specifically, to standardize the scores across each batch of input pairs, ensuring that the batch has a mean of 0 and a standard deviation of 1. This can make the network more robust to different scales of raw similarity scores and can improve the speed, performance, and stability of the twin neural network 245.

A final activation module 560 in the external layer 530 applies a final activation function to the output of the embedding subnetworks (510, 520). The final activation layer is used to convert the embeddings generated by the subnetworks (510, 520) to a final value reflecting the difference between the different fields. For example, if the objective is to determine the similarity between two inputs provided by the pair generator 260, the desired output might be a single number representing the degree of similarity. In this case, a sigmoid activation function might be used in the final layer to squash the output into the range [0, 1], which can be interpreted as the probability that the two sequences are similar.

Thus, the Siamese neural network 245, in effect, takes two copies of a subnetwork (510, 520) and joins them together with an external layer 530 that determines the distance between the embeddings that arise when pairs of data are input together. Specifically, each of the subnetworks (510, 520) processes an input and produces an output vector. The external layer 530 (or "final activation layer") takes these two output vectors and computes a final output, which could be, for example, a similarity score (e.g., based on Euclidian distance) between the two input sequences. A loss function (e.g., contrastive loss or triplet loss) is used to compute a scalar loss value. The loss function is adapted to encourage similar input pairs to have similar output vectors and dissimilar input pairs to have dissimilar output vectors.

In the backpropagation process, the gradient of the loss function is computed with respect to each parameter in the models (i.e., weights and biases). This is done, in effect, by a calculation that works backwards from the loss function, through the final activation layer, and back through the subnetworks (510, 520). The gradients computed during backpropagation are used to adjust the model parameters in a way that reduces the loss. This may be done using an optimization algorithm, such as stochastic gradient descent (SGD).

In the Siamese neural network architecture, the subnetworks (510, 520) share weights, meaning they have the same parameters. When the gradients are computed during backpropagation, they are accumulated across both subnetworks (510, 520), and the weights are updated based on the combined gradients. This process is repeated over many epochs (i.e., iterations over the training data), gradually adjusting the weights and biases to minimize the loss and learn a useful representation of the inputs. Over time, the subnetworks (510, 520) learn to output similar vectors for similar inputs and different vectors for different inputs.

One of the advantages in terms of training the subnetwork such that the distance, e.g., the Euclidian distance, is minimized between similar data points is that it tends to generate compact clusters that are amenable to other classifiers. Therefore, once the Siamese neural network 245 is trained, the embedding subnetwork can then be used as a preprocessor to train and evaluate either a machine learning technique or as the feed into a secondary neural network.

Figures 6, 7:
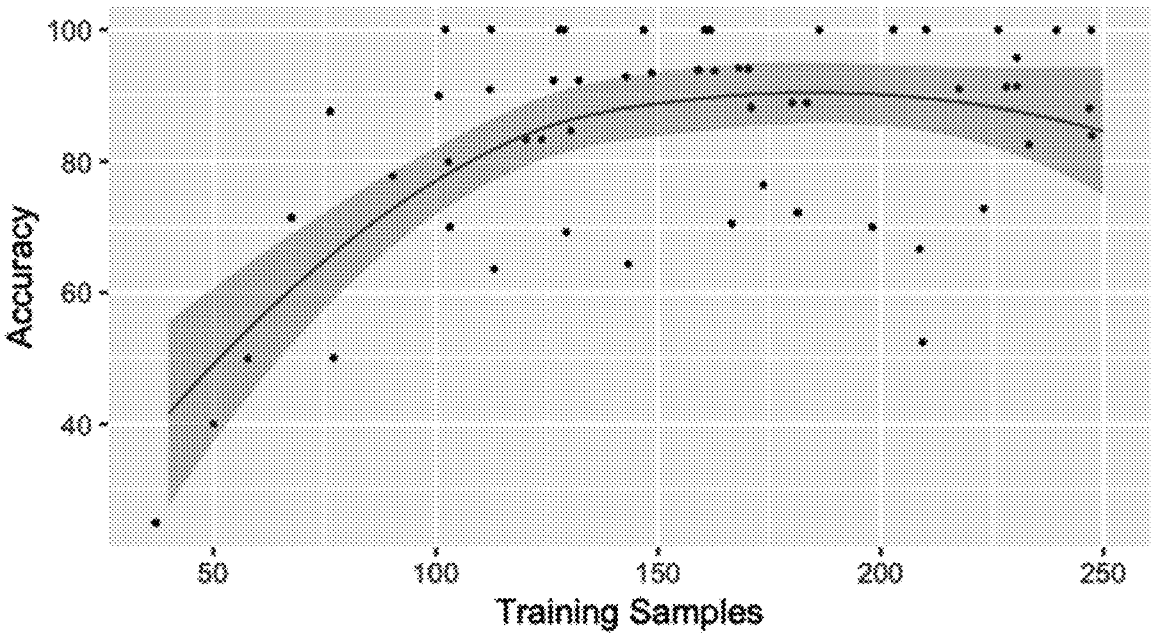
FIG. 6 is a table of overall accuracy and macro F1 scores for disclosed methods, using three methods of evaluating the predicted labels, compared with two prior approaches.
FIG. 7 is a plot of accuracy versus the number of training samples per class.

FIG. 6 is a table of overall accuracy and macro F1 for disclosed methods, using three methods of evaluating the predicted labels, compared with two prior approaches. The evaluation of the final classification results for the disclosed approach was done using a 10% stratified holdout, i.e., 10% of entries for each SDTM field were held out from the model training process to be evaluated. This ensured that each class in the dataset would be represented in both the training and testing sets. Basic accuracy, i.e., the number of predictions in the holdout set that matched their SDTM field, was evaluated, as well as the macro F1 scores. The results show that the disclosed approach can accurately predict most of the proper SDTM mappings. In most of the cases, the nearest neighbor is a good predictor of a given class. In the evaluation, the closest field in the embedding space was able to predict the proper SDTM field ~90% of the time.

As a comparison, two prior machine learning (ML) approaches which were implemented by the inventors for the task of mapping EDC fields to SDTM fields. The first approach used a conventional ML tool, XGBoost (an optimized distributed gradient boosting library), on the same field metadata, where the metadata was encoded via term frequency-inverse document frequency (TF-IDF). The second method was an attempt at direct prediction of field mappings using a deep learning implementation that used a pre-trained text embedding layer (RoBERTa) along with two bi-directional LSTMs implemented in Keras. It is clear from the results presented in the table that the disclosed approach—using Siamese neural networks and an ML classifier—is significantly more accurate than prior attempts using conventional ML techniques or direct prediction with neural networks.

An analysis of the clustering produced in the embedding indicated that the Siamese neural networks were able to generate sufficiently compact embedding to allow machine learning (ML) techniques (e.g., ML classification models) to accurately separate classes. It was found that EDC fields that map to the same SDTM field are located in close proximity in the embedding space, thereby providing classification with high accuracy. It is noted that the results presented herein are for the holdout set only. The self-prediction accuracy of the algorithm was greater than 99%. However, issues such as the disjoint nature of the vocabulary between the testing and training sets led to lower accuracy for the holdout set.

FIG. 7 is a plot of accuracy versus the number of training samples per class. Though, on average, the accuracy was high, there was a relatively large spread in the accuracy per class. While the majority of the classes exhibited accuracy greater than 90%, the minimum accuracy was only 25%. However, there is a clear trend of increasing accuracy as the amount of training data increases. It was observed that in classes with fewer than 100 examples within their training data, there was insufficient information to capture the variability of how the field is represented. For classes with greater than 100 training samples, greater than 90% of the fields were predicted correctly.

In comparison to the conventional implementations that were evaluated, there was a significant increase in the accuracy of the evaluation without any specific degree of neural network architecture tuning. On average there was a 10-15% improvement in the overall classification accuracy when compared to the conventional techniques, as defined by the labels being correctly predicted. Furthermore, the prediction results were more consistent across different classes as evidenced by the significantly higher macro-F1 scores.

In an evaluation of the disclosed embodiments, it was shown that for the set of domains for which the data was trained and tested, there was sufficient information in the metadata associated with EDC fields to accurately determine the SDTM fields to which they matched. The use of Siamese neural networks allowed for the generation of embeddings in which EDC fields that were mapped to the same SDTM field were embedded close together in the same space. Most of the inaccuracies in the evaluation could be explained by a relative lack of training data for particular domains and a relative lack of overlapping vocabularies, which tended to prevent the embedding layer from generating informative embeddings for some of the training data. Both of these appeared to be data related issues and could be resolved through the expansion of the dataset.

During the training process of the Siamese neural network, the ability to predict whether two entries mapped to the same SDTM domain were reaching accuracies of greater than 99%. For the cases where sufficient training data was present, the overall accuracy of the holdout set was greater than 95% which suggested that the model was sufficiently generalized for practical uses. The model was relatively accurate on the holdout set even with the issues with disjoint vocabulary and lack of samples in certain domains, which means that expanding the training data would have yielded greater accuracy. The other area of the evaluation in which there were inaccuracies was related to fields which may be duplicated across multiple fields, such as dates. For instance, many forms will have EDC fields that reference dates in which the majority of the metadata is identical, but whose SDTM mapping is determined by the FormOID only. For these cases, the approaches described herein can be used, but rather than looking at each EDC field independently, the metadata would be aggregated across all fields and the target would be the SDTM domain rather than the SDTM field.

Aspects of the present invention may be embodied in the form of a system, a computer program product, or a method. Similarly, aspects of the present invention may be embodied as hardware, software, or a combination of both. Aspects of the present invention may be embodied as a computer program product saved on one or more computer-readable media in the form of computer-readable program code embodied thereon.

The computer-readable medium may be a computer-readable storage medium. A computer-readable storage medium may be, for example, an electronic, optical, magnetic, electromagnetic, infrared, or semiconductor system, apparatus, or device, or any combination thereof.

Computer program code in embodiments of the present invention may be written in any suitable programming and/or scripting language. The program code may execute on a single computer, or on a plurality of computers. The computer may include a processing unit in communication with a computer-usable medium, where the computer-usable medium contains a set of instructions, and where the processing unit is designed to carry out the set of instructions, and/or a trained machine learning algorithm.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of converting an Electronic Data Capture (EDC) dataset to a Standard Data Tabulation Model (SDTM) dataset, the method comprising:

processing metadata for an EDC dataset, the metadata comprising EDC field names, to produce vectors of dimensionality $n_1$, where $n_1$ is an integer;

processing the vectors of dimensionality $n_1$, in an embedding model, to produce embedded vectors of dimensionality $n_2$, where $n_2$ is an integer and is less than $n_1$;

training a classification model using a subset of the metadata that is pre-mapped to a subset of the SDTM field names, wherein the subset of the metadata is processed by the embedding model before being input to the classification model;

processing the embedded vectors, in the trained classification model, to produce class predictions for the EDC field names, the classes corresponding to the SDTM field names;

mapping the EDC field names, respectively, with the SDTM field names based at least in part on the class predictions for the EDC field names; and converting the EDC dataset to an SDTM dataset based at least in part on said mapping, wherein the embedding model is obtained from a trained Siamese neural network comprising a first embedding subnetwork and a second embedding subnetwork.

2. The method of claim 1, further comprising training the Siamese neural network based on a subset of the EDC field names which is pre-mapped to a subset of the SDTM field names.

3. The method of claim 2, wherein the subset of the EDC field names is manually curated.

4. The method of claim 2, the method further comprising generating pairs of vectors of dimensionality $n_1$ to be input, respectively, to the first embedding subnetwork and the second embedding subnetwork.

5. The method of claim 4, further comprising processing, by the first embedding subnetwork and the second embedding subnetwork, the vectors of dimensionality $n_1$ in a long short-term memory neural network to produce the embedded vectors.

6. The method of claim 4, further comprising determining, in an external layer of the Siamese neural network, a distance between each pair of the embedded vectors produced, respectively, by the first embedding subnetwork and the second embedding subnetwork.

7. A system for converting an Electronic Data Capture (EDC) dataset to a Standard Data Tabulation Model (SDTM) dataset, comprising:

a computer having one or more processors in communication with a memory, the memory storing instructions executable by said one or more processors to perform:

processing metadata for an EDC dataset, the metadata comprising EDC field names, to produce vectors of dimensionality $n_1$, where $n_1$ is an integer;

processing the vectors of dimensionality $n_1$, in an embedding model, to produce embedded vectors of dimensionality $n_2$, where $n_2$ is an integer and is less than $n_1$;

training a classification model using a subset of the metadata that is pre-mapped to a subset of the SDTM field names, wherein the subset of the metadata is processed by the embedding model before being input to the classification model;

processing the embedded vectors, in the trained classification model, to produce class predictions for the EDC field names, the classes corresponding to the SDTM field names;

mapping the EDC field names, respectively, with the SDTM field names based at least in part on the class predictions for the EDC field names; and converting the EDC dataset to an SDTM dataset based at least in part on said mapping, wherein the embedding model is obtained from a trained Siamese neural network comprising a first embedding subnetwork and a second embedding subnetwork.

8. The system of claim 7, further comprising training the Siamese neural network based on a subset of the EDC field names which is pre-mapped to a subset of the SDTM field names.

9. The system of claim 8, wherein the subset of the EDC field names is manually curated.

10. The system of claim 8, the method further comprising generating pairs of vectors of dimensionality $n_1$ to be input, respectively, to the first embedding subnetwork and the second embedding subnetwork.

11. The system of claim 10, further comprising processing, by the first embedding subnetwork and the second embedding subnetwork, the vectors of dimensionality $n_1$ in a long short-term memory neural network to produce the embedded vectors.

12. The system of claim 10, further comprising determining, in an external layer of the Siamese neural network, a distance between each pair of the embedded vectors produced, respectively, by the first embedding subnetwork and the second embedding subnetwork.

13. A non-transitory computer-readable medium storing instructions that, when executed by one or more processors of a computer, cause said one or more processors to perform a method of converting an Electronic Data Capture (EDC) dataset to a Standard Data Tabulation Model (SDTM) dataset, the method comprising:

processing metadata for an EDC dataset, the metadata comprising EDC field names, to produce vectors of dimensionality $n_1$, where $n_1$ is an integer;

processing the vectors of dimensionality $n_1$, in an embedding model, to produce embedded vectors of dimensionality $n_2$, where $n_2$ is an integer and is less than $n_1$;

training a classification model using a subset of the metadata that is pre-mapped to a subset of the SDTM field names, wherein the subset of the metadata is processed by the embedding model before being input to the classification model;

processing the embedded vectors, in the trained classification model, to produce class predictions for the EDC field names, the classes corresponding to the SDTM field names;

mapping the EDC field names, respectively, with the SDTM field names based at least in part on the class predictions for the EDC field names; and converting the EDC dataset to an SDTM dataset based at least in part on said mapping, wherein the embedding model is obtained from a trained Siamese neural network comprising a first embedding subnetwork and a second embedding subnetwork.

14. The computer-readable medium of claim 13, wherein the method further comprises training the Siamese neural network based on a subset of the EDC field names which is pre-mapped to a subset of the SDTM field names.

15. The computer-readable medium of claim 14, wherein the subset of the EDC field names is manually curated.

16. The computer-readable medium of claim 14, wherein the method further comprises generating pairs of vectors of dimensionality $n_1$ to be input, respectively, to the first embedding subnetwork and the second embedding subnetwork.

17. The computer-readable medium of claim 16, wherein the method further comprises processing, by the first embedding subnetwork and the second embedding subnetwork, the vectors of dimensionality $n_1$ in a long short-term memory neural network to produce the embedded vectors.

18. The computer-readable medium of claim 16, wherein the method further comprises determining, in an external layer of the Siamese neural network, a distance between each pair of the embedded vectors produced, respectively, by the first embedding subnetwork and the second embedding subnetwork.

* * * * *